US008910045B2

(12) United States Patent
Baum (10) Patent No.: US 8,910,045 B2
(45) Date of Patent: Dec. 9, 2014

(54) METHODS AND APPARATUS FOR DISPLAYING AN ADVERTISEMENT (75) Inventor: Geoffrey King Baum, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1874 days.

(21) Appl. No.: 11/702,460

(22) Filed: Feb. 5, 2007

(65) Prior Publication Data

US 2014/0304729 A1 Oct. 9, 2014

(51) Int. Cl.
*G06F 3/00* (2006.01)
*H04N 21/81* (2011.01)

(52) U.S. Cl.
CPC .................. *H04N 21/812* (2013.01)
USPC .......... 715/719; 715/716; 705/14.4; 705/26.1

(58) Field of Classification Search
CPC ..... G06F 3/048; G06F 3/0481; G06F 3/0482; G06F 3/0484; G06F 3/01
USPC ............... 715/716, 719; 705/14, 26
See application file for complete search history.

(56) References Cited

U.S. PATENT DOCUMENTS

| | | | | |
|---|---|---|---|---|
| 2,258,351 A * | 10/1941 | Brown, Jr. | | 40/474 |
| 5,781,894 A * | 7/1998 | Petrecca et al. | | 705/14 |
| 5,996,007 A * | 11/1999 | Klug et al. | | 709/218 |
| 6,182,050 B1 * | 1/2001 | Ballard | | 705/14 |
| 6,216,112 B1 * | 4/2001 | Fuller et al. | | 705/14 |
| 6,304,852 B1 * | 10/2001 | Loncteaux | | 705/14 |
| 6,373,498 B1 * | 4/2002 | Abgrall | | 345/619 |
| 6,438,750 B1 * | 8/2002 | Anderson | | 717/178 |
| 6,587,138 B1 * | 7/2003 | Vogt et al. | | 348/14.12 |
| 6,665,653 B1 * | 12/2003 | Heckerman et al. | | 706/47 |
| 6,757,027 B1 * | 6/2004 | Edwards et al. | | 348/722 |
| 6,791,572 B1 * | 9/2004 | Cloney et al. | | 345/619 |
| 6,804,659 B1 * | 10/2004 | Graham et al. | | 705/14 |
| 6,956,574 B1 | 10/2005 | Cailloux et al. | | |
| 7,057,591 B1 * | 6/2006 | Hautanen et al. | | 345/87 |
| 7,181,415 B2 * | 2/2007 | Blaser et al. | | 705/14 |
| 7,472,102 B1 * | 12/2008 | Heckerman et al. | | 706/47 |
| 2002/0107759 A1 * | 8/2002 | An | | 705/26 |
| 2002/0112005 A1 * | 8/2002 | Namias | | 709/206 |
| 2002/0116716 A1 * | 8/2002 | Sideman | | 725/91 |
| 2002/0120564 A1 * | 8/2002 | Strietzel | | 705/40 |
| 2002/0133565 A1 * | 9/2002 | Huat | | 709/218 |
| 2002/0154163 A1 * | 10/2002 | Melchner | | 345/749 |
| 2003/0040982 A1 * | 2/2003 | Yang | | 705/27 |
| 2003/0108329 A1 * | 6/2003 | Adriansen et al. | | 386/52 |
| 2004/0010546 A1 * | 1/2004 | Klug et al. | | 709/203 |
| 2004/0125149 A1 * | 7/2004 | Lapidous | | 345/808 |
| 2004/0162760 A1 * | 8/2004 | Seet et al. | | 705/14 |
| 2004/0171378 A1 * | 9/2004 | Rautila | | 455/419 |
| 2004/0172325 A1 * | 9/2004 | Blanco et al. | | 705/14 |
| 2004/0177382 A1 * | 9/2004 | Choi | | 725/135 |
| 2004/0261100 A1 * | 12/2004 | Huber et al. | | 725/32 |
| 2004/0268384 A1 * | 12/2004 | Stone | | 725/32 |
| 2005/0129187 A1 * | 6/2005 | Agapi et al. | | 379/76 |

(Continued)

*Primary Examiner* — Tuyetlien Tran (74) *Attorney, Agent, or Firm* — Kilpatrick Townsend & Stockton LLP (57) ABSTRACT

A system receives notification of a processing action associated with a video, and determines a time interval associated with the processing action. The system selects an advertisement, based on the time interval associated with the processing action. The system then renders the advertisement during the time interval associated with the processing action associated with a video.

22 Claims, 8 Drawing Sheets

(56) References Cited

U.S. PATENT DOCUMENTS

| | | | |
|---|---|---|---|
| 2005/0215238 A1* | 9/2005 | Macaluso | 455/414.1 |
| 2005/0259956 A1* | 11/2005 | Chen | 386/52 |
| 2005/0273355 A1* | 12/2005 | Yamada | 705/1 |
| 2005/0276573 A1* | 12/2005 | Abbate | 386/52 |
| 2006/0218617 A1* | 9/2006 | Bradstreet et al. | 725/135 |
| 2007/0043616 A1* | 2/2007 | Kutaragi et al. | 705/14 |
| 2007/0079331 A1* | 4/2007 | Datta et al. | 725/42 |
| 2007/0124762 A1* | 5/2007 | Chickering et al. | 725/35 |
| 2008/0025478 A1* | 1/2008 | Taylor et al. | 379/70 |
| 2008/0109305 A1* | 5/2008 | Hengel et al. | 705/14 |
| 2008/0178211 A1* | 7/2008 | Lillo et al. | 725/32 |
| 2008/0195471 A1* | 8/2008 | Dube et al. | 705/14 |

* cited by examiner

205 RECEIVE NOTIFICATION OF A PROCESSING ACTION ASSOCIATED WITH A VIDEO

206 PROVIDE A GRAPHICAL USER INTERFACE ALLOWING A USER TO PERFORM THE PROCESSING ACTION ASSOCIATED WITH THE VIDEO

OR

207 RECEIVE NOTIFICATION THAT A USER HAS SELECTED A VIDEO TO DOWNLOAD

OR

208 RECEIVE NOTIFICATION THAT A USER HAS MODIFIED THE VIDEO

OR

209 RECEIVE NOTIFICATION THAT A USER HAS SAVED A MODIFIED VERSION OF THE VIDEO

*FIG. 3*

210 DETERMINE A TIME INTERVAL ASSOCIATED WITH THE PROCESSING ACTION

211 DETERMINE A TIME INTERVAL ASSOCIATED WITH THE PROCESSING ACTION BASED ON AT LEAST ONE ATTRIBUTE ASSOCIATED WITH AT LEAST ONE OF:
i) THE PROCESSING ACTION ASSOCIATED WITH THE VIDEO;
ii) THE VIDEO;
iii) A USER PERFORMING THE PROCESSING ACTION ASSOCIATED WITH THE VIDEO; AND
iv) A HISTORY ASSOCIATED WITH THE PROCESSING ACTION

OR

212 IDENTIFY THE TIME INTERVAL ASSOCIATED WITH A USER?S PERCEPTION OF A TIME SPAN REQUIRED TO COMPLETE THE PROCESSING ACTION PERFORMED ON THE VIDEO

*FIG. 4*

213 SELECT AN ADVERTISEMENT BASED ON THE TIME INTERVAL ASSOCIATED WITH THE PROCESSING ACTION

214 IDENTIFY AT LEAST ONE ATTRIBUTE ASSOCIATED WITH THE VIDEO

215 SELECT THE ADVERTISEMENT BASED ON THE AT LEAST ONE ATTRIBUTE ASSOCIATED WITH THE VIDEO

OR

216 EXAMINE A SPECIFICATION ASSOCIATED WITH THE PROCESSING ACTION ASSOCIATED WITH THE VIDEO

217 SELECT AN ADVERTISEMENT BASED ON THE SPECIFICATION

*FIG. 5*

218 SELECT AN ADVERTISEMENT BASED ON THE TIME INTERVAL ASSOCIATED WITH THE PROCESSING ACTION

219 IDENTIFY AT LEAST ONE MODIFICATION TO A SPECIFICATION ASSOCIATED WITH THE PROCESSING ACTION ASSOCIATED WITH THE VIDEO

↓

220 SELECT AN ADVERTISEMENT BASED ON THE MODIFICATION TO THE SPECIFICATION

OR

221 APPLY A POLICY TO AT LEAST ONE OF:
i) THE VIDEO;
ii) THE ADVERTISEMENT;
iii) A USER PERFORMING THE PROCESSING ACTION ON THE VIDEO; AND
iv) THE TIME INTERVAL ASSOCIATED WITH THE PROCESSING ACTION;

↓

222 SELECT THE ADVERTISEMENT BASED ON THE APPLIED POLICY

METHODS AND APPARATUS FOR DISPLAYING AN ADVERTISEMENT

BACKGROUND

Conventional computerized devices, such as personal computers, laptop computers, and the like utilize graphical user interfaces in applications such as operating systems and graphical editors (i.e., web page editors, document editors, video editors, etc.) that enable users to quickly provide input and create projects using "What You See Is What You Get" (WYSIWYG) technology. In general, using a graphical user interface, a user operates an input device such as a mouse or keyboard to manipulate digital content on a computer display. The digital content is often represented as icons, and the user can operate an input device such as a mouse to move a mouse pointer onto an icon (i.e., graphically overlapping the icon on the graphical user interface). By depressing a mouse button, the application (such as the operating system desktop) selects the icon, and if the user maintains the mouse button in a depressed state, the user can drag the icon across the graphical user interface. By releasing the mouse button, the icon is placed on the graphical user interface at the current position of the mouse pointer. Using graphical user interface technology, users can create projects by dragging and dropping digital content (i.e., graphical objects, text, text boxes, images, videos, etc) into the project. For example, users can edit video by dragging and dropping sections of video clips into a video editor. Once projects are created, users can modify the projects. Users can also publish (i.e., upload to the Internet) projects, for example, videos.

SUMMARY

Conventional technologies for downloading, creating, modifying and publishing content, such as video clips, suffer from a variety of deficiencies. In particular, conventional technologies for downloading, creating, modifying and publishing content are limited in that each time a processing action (i.e., such as downloading, creating, modifying, publishing, etc.) is performed on a video, the user must wait while the processing action is completed. Additionally, each modification to the video creates a new copy of that video (with the included modifications), resulting in increased storage required for each modified version of the video.

Embodiments disclosed herein significantly overcome such deficiencies and provide a system that includes a computer system executing an advertisement displaying process. The advertisement displaying process utilizes the time during which a user must wait (for a processing action on a video to be completed), and displays an advertisement during that waiting period. The advertisement displaying process receives notification that a user has performed a processing action on a video, such as publishing a video to the Internet. As processing actions are performed on the video (i.e., creating, modifying, etc.), an edit decision list, for example, an Extended Markup Language (XML) document, is created, detailing those processing actions. However, the processing action is not actually performed on the video. When the video is rendered (i.e., published, played, displayed, etc.), the edit decision list (such as a configuration file) is invoked, and the video is rendered according to the processing actions specified in the edit decision list (such as a configuration file). The actual video is not modified, nor are additional versions/copies of the video created. The edit decision list (such as a configuration file) contains instructions to perform non-destructive modifications to the video, at specific points in the video.

During the rendering of the video, the advertisement displaying process determines a time interval associated with the rendering of the video, had an actual copy of the video (with processing actions performed on the video) been created. The advertisement displaying process displays advertisements during that time interval. In other words, a user accesses a video, and makes modifications to that video. The time to publish the modified video to the Internet may span, for example, several minutes. The advertisement displaying process creates an edit decision list detailing the modifications to the video. When the user publishes (i.e., uploads the video to the Internet) the video, it is the edit decision list (such as a configuration file) that is actually uploaded to the Internet. The advertisement displaying process determines how long publishing the video would (theoretically) take, and displays an advertisement of an appropriate length to the user during that time interval.

The advertisement displaying process selects the advertisement to display based on, for example, the content of the video, knowledge the advertisement displaying process has about the user, the contents of the edit decision list (such as a configuration file), modifications to the edit decision list (such as a configuration file), etc. In an example embodiment, the advertisement displaying process applies a policy to, for example, the video, the advertisement, the user, etc., when selecting the advertisement to display. For example, the advertisement displaying process may determine that the user is a minor, and selects an advertisement from a plurality of advertisements suitable for children.

The advertisement displaying process may select the advertisement from a cached plurality of advertisements or may stream the advertisement during the displaying of the advertisement. The advertisement displaying process may display only those advertisements that the user has not previously viewed.

The advertisement displaying process provides a graphical user interface in which the user views the advertisement. In an example embodiment, the advertisement displaying process provides a pop up window in which to display the advertisement. Thus, the user is assured that the advertisement is separate from the video.

The advertisement displaying process receives notification of a processing action associated with a video. The advertisement displaying process determines a time interval associated with the processing action, and selects an advertisement based on the time interval associated with the processing action. The advertisement displaying process renders the advertisement during time interval associated with the processing action associated with a video. The advertisement displaying process creates a specification associated with the processing action associated with a video. The specification identifies at least one of i) the video,
ii) the processing action associated with the video,
iii) the time interval associated with the processing action, and
iv) the advertisement.

During an example operation of one embodiment, suppose a user, such as a film producer, downloads a video from a video library. The film producer makes edits to the video, such as removing several sections of the video, adding music to the video, etc. The film producer saves these modifications. The modifications are captured in an edit decision list. No actual modifications are made to the video. The advertisement displaying process evaluates the modifications made to the video, and determines a time interval associated with how long it would actually take to save and upload the video to the Internet, had those modifications actually been made to the video. The advertisement displaying process then selects advertisements that can be rendered within the time interval, and are appropriate based on the user, the video, etc. When the film producer publishes (i.e., uploads the video to the Internet) such that others can view the video with these new modifications, the advertisement displaying process uploads the edit decision list (such as a configuration file), and during the calculated time interval, displays advertisements to the user.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems Incorporated of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include methods, software and a computer system that performs an advertisement displaying process within a graphical user interface. The advertisement displaying process utilizes the time during which a user must wait (for a processing action on a video to be completed), and displays an advertisement during that waiting period. The advertisement displaying process receives notification that a user has performed a processing action on a video, such as publishing a video to the Internet. As processing actions are performed on the video (i.e., creating, modifying, etc.), an edit decision list, for example, an Extended Markup Language (XML) document, is created, detailing those processing actions. However, the processing action is not actually performed on the video. When the video is rendered (i.e., published, played, displayed, etc.), the edit decision list (such as a configuration file) is invoked, and the video is rendered according to the processing actions specified in the edit decision list (such as a configuration file). The actual video is never modified, nor are additional versions/copies of the video created. The edit decision list (such as a configuration file) contains instructions to perform non-destructive modifications to the video, at specific points in the video.

During the rendering of the video, the advertisement displaying process determines a time interval associated with the rendering of the video, had an actual copy of the video (with processing actions performed on the video) been created. The advertisement displaying process displays advertisements during that time interval. In other words, a user downloads a video, and makes modifications to that video. The time to publish the video to the Internet may span, for example, several minutes. The advertisement displaying process creates an edit decision list detailing the modifications to the video. When the user publishes (i.e., uploads the video to the Internet) the video, it is the edit decision list (such as a configuration file) that is actually uploaded to the Internet.

The time to upload the text based edit decision list (such as a configuration file) is typically much less than the time to upload an edited video. The advertisement displaying process determines how long publishing the video would (theoretically) take, and displays an advertisement to the user during that time interval.

The advertisement displaying process selects the advertisement to display based on, for example, the content of the video, knowledge the advertisement displaying process has about the user, the contents of the edit decision list (such as a configuration file), modifications to the edit decision list (such as a configuration file), etc. In an example embodiment, the advertisement displaying process applies a policy to, for example, the video, the advertisement, the user, etc., when selecting the advertisement to display. For example, the advertisement displaying process may determine that the user is a minor, and selects an advertisement from a plurality of advertisements suitable for children.

The advertisement displaying process may select the advertisement from a cached plurality of advertisements or may stream the advertisement during the displaying of the advertisement. The advertisement displaying process may display only those advertisements that the user has not previously viewed.

The advertisement displaying process provides a graphical user interface in which the user views the advertisement. In an example embodiment, the advertisement displaying process provides a pop up window in which to display the advertisement. Thus, the user is assured that the advertisement is separate from the video.

The advertisement displaying process receives notification of a processing action associated with a video. The advertisement displaying process determines a time interval associated with the processing action, and selects an advertisement based on the time interval associated with the processing action. The advertisement displaying process renders the advertisement during time interval associated with the processing action associated with a video. The advertisement displaying process creates a specification associated with the processing action associated with a video. The specification identifies at least one of    i) the video,
   ii) the processing action associated with the video,
   iii) the time interval associated with the processing action, and
   iv) the advertisement.

Figure 1:
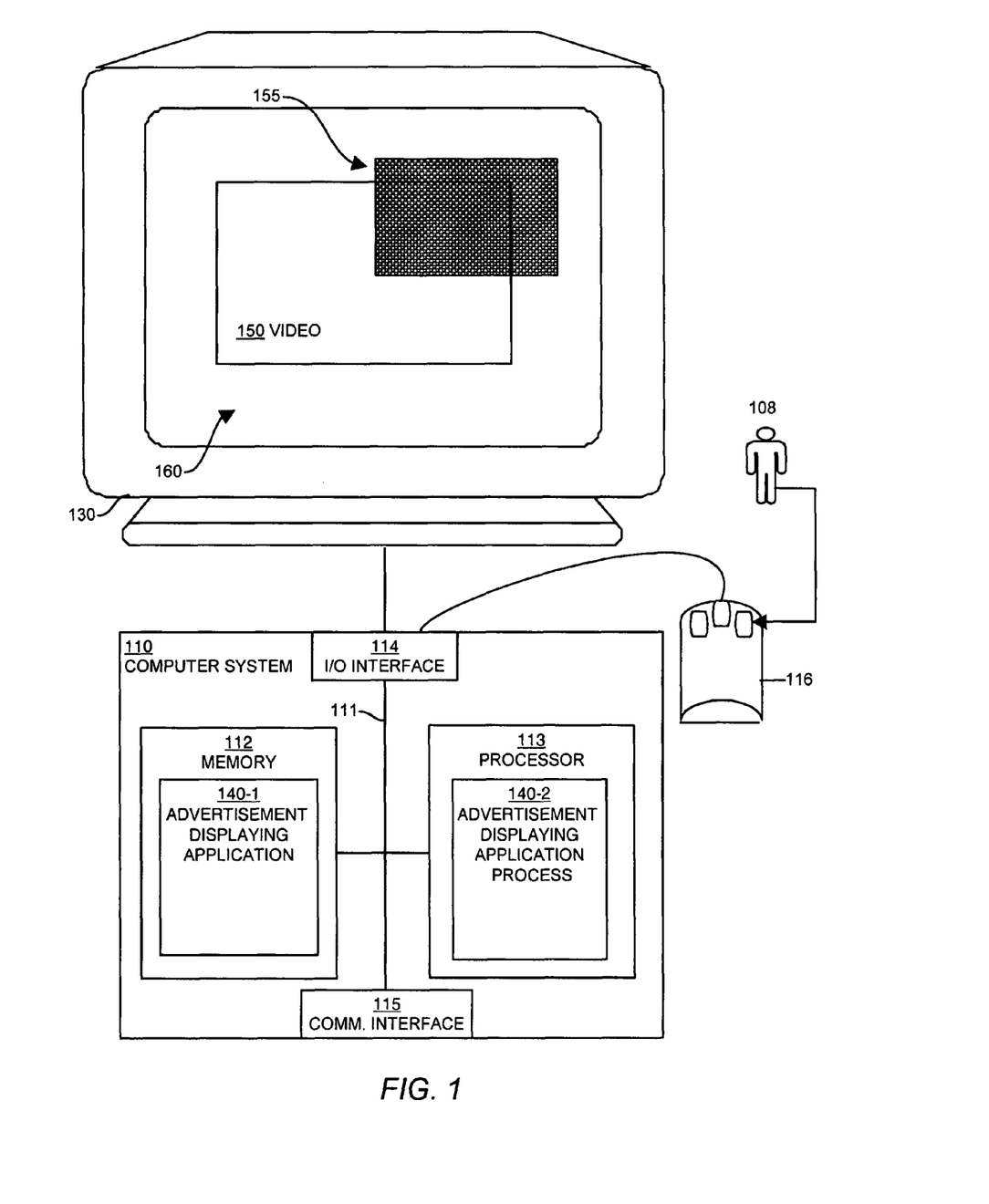
FIG. 1 shows a high-level block diagram of a computer system according to one embodiment disclosed herein.

FIG. 1 is a block diagram illustrating example architecture of a computer system 110 that executes, runs, interprets, operates or otherwise performs an advertisement displaying application 140-1 and advertisement displaying process 140-2 suitable for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the advertisement displaying application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown). The graphical user interface 160 renders a video 150 and an advertisement 155.

The memory system 112 is any type of computer readable medium, and in this example, is encoded with an advertisement displaying application 140-1 as explained herein. The advertisement displaying application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the advertisement displaying application 140-1. Execution of the advertisement displaying application 140-1 in this manner produces processing functionality in an advertisement displaying process 140-2. In other words, the advertisement displaying process 140-2 represents one or more portions or runtime instances of the advertisement displaying application 140-1 (or the entire advertisement displaying application 140-1) performing or executing within or upon the processor 113 in the computerized device 110 at runtime.

It is noted that example configurations disclosed herein include the advertisement displaying application 140-1 itself (i.e., in the form of un-executed or non-performing logic instructions and/or data). The advertisement displaying application 140-1 may be stored on a computer readable medium (such as a floppy disk), hard disk, electronic, magnetic, optical, or other computer readable medium. The advertisement displaying application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the advertisement displaying application 140-1 in the processor 113 as the advertisement displaying process 140-2. Those skilled in the art will understand that the computer system 110 may include other processes and/or software and hardware components, such as an operating system not shown in this example.

A display 130 need not be coupled directly to computer system 110. For example, the advertisement displaying application 140-1 can be executed on a remotely accessible computerized device via the network interface 115. In this instance, the graphical user interface 160 may be displayed locally to a user 108 of the remote computer, and execution of the processing herein may be client-server based.

Further details of configurations explained herein will now be provided with respect to a flow chart of processing steps that show the high level operations disclosed herein to perform the advertisement displaying process 140-2.

Figure 2:
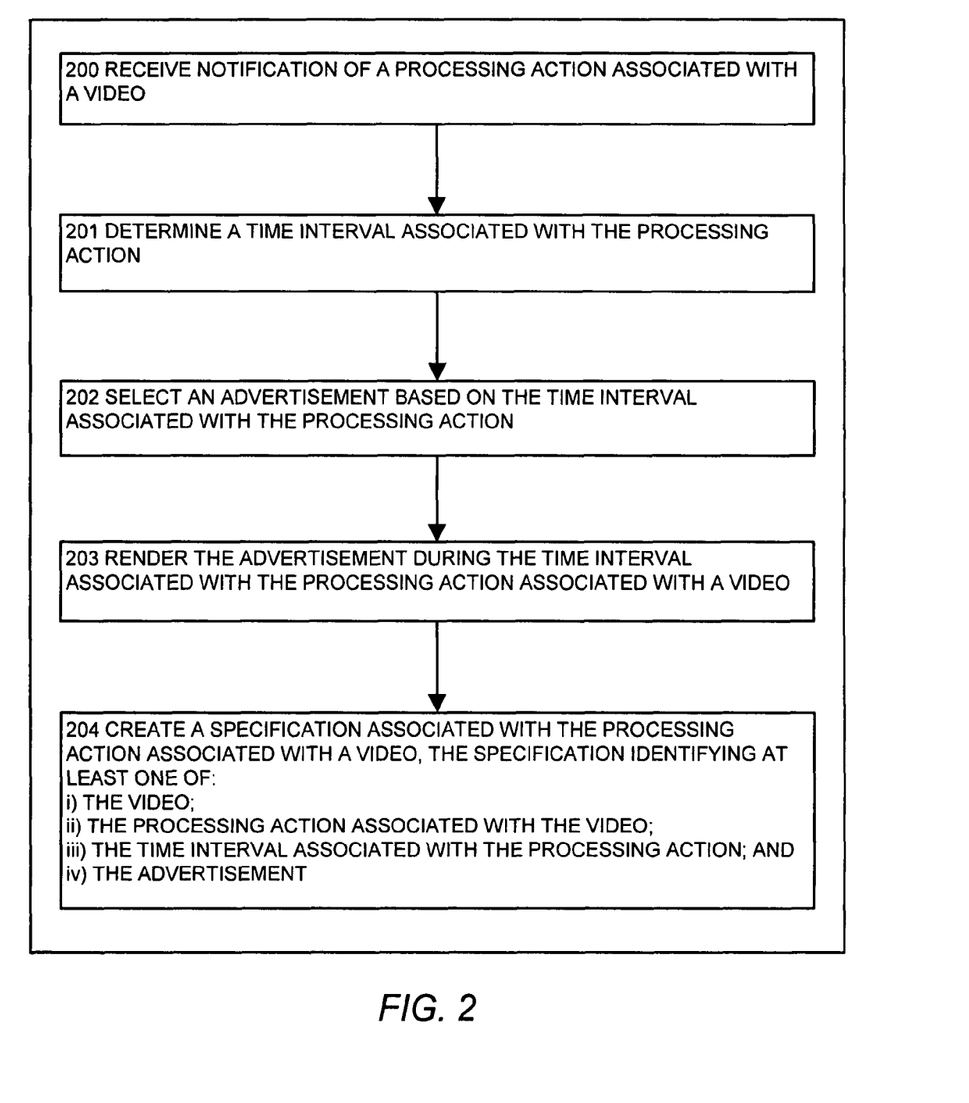
FIG. 2 illustrates a flowchart of a procedure performed by the system of FIG. 1 when the advertisement displaying process receives notification of a processing action associated with a video, according to one embodiment disclosed herein.

FIG. 2 is a flowchart of the steps performed by the advertisement displaying process 140-2 when it receives notification of a processing action associated with a video 150.

In step 200, the advertisement displaying process 140-2 receives notification of a processing action associated with a video 150. In an example embodiment, a user 108 is operating a video editor within a graphical user interface 160. The video editor allows the user to access a video 150 from a video site host, or from the user's 108 own video collection. The user can perform processing actions on the video 150 such as modifying the video 150, and saving that modified version of the video 150. The user 108 believes they are saving a modified version of the video 150, but the modifications are made to the edit decision list (such as a configuration file), and the edit decision list (such as a configuration file) is saved, not the actual modified video 150. In step 201, the advertisement displaying process 140-2 determines a time interval associated with the processing action. The advertisement displaying process 140-2 examines the processing action that was performed on the video 150, and determines a time interval that correlates to the processing action. For example, a user 108 downloads a video 150, makes several modifications to the video 150, and then saves the video 150. The advertisement displaying process 140-2 determines the time interval associated with saving the video 150 in light of the (several) modifications made to the video 150 by the user 108. The user 108 believes they are saving a version of the video 150, but the modifications are made to the edit decision list (such as a configuration file), and it is a new version of the edit decision list (such as a configuration file) that is saved, not the video 150.

In step 202, the advertisement displaying process 140-2 selects an advertisement 155 based on the time interval associated with the processing action. The advertisement displaying process 140-2 determines the time interval associated with processing action (such as making modifications to a video 150, and then saving those modifications), and then selects an advertisement 155 that can be rendered on the graphical user interface 160 during that time interval.

In step 203, the advertisement displaying process 140-2 renders the advertisement 155 during time interval associated with the processing action associated with a video 150. The advertisement displaying process 140-2 renders the advertisement 155 within the graphical user interface 160 to be displayed to the user 108 performing the processing action on the video 150. The user 108 views the video 150 within the graphical user interface 160 during the time interval that the user 108 believes the processing action is being performed on the video 150 (such as saving a modified version of the video 150).

In step 204, the advertisement displaying process 140-2 creates a specification associated with the processing action associated with a video 150. The specification, for example, an Extensible Markup Language (XML) document, identifies at least one of:

i) the video 150;
ii) the processing action associated with the video 150;
iii) the time interval associated with the processing action; and
iv) the advertisement 155.

In an example embodiment, the advertisement displaying process 140-2 creates a specification containing information associated with the processing actions that were performed on the video 150. As the user 108, works in a video editor within the graphical user interface 160, those modifications are captured in an edit decision list. When a processing action (such as publishing, or uploading the video 150 to the Internet, etc.) is performed on the video 150, the advertisement displaying process 140-2 invokes the specification to render the video 150. Each time the video 150 is rendered, the specification is invoked.

Figure 3:
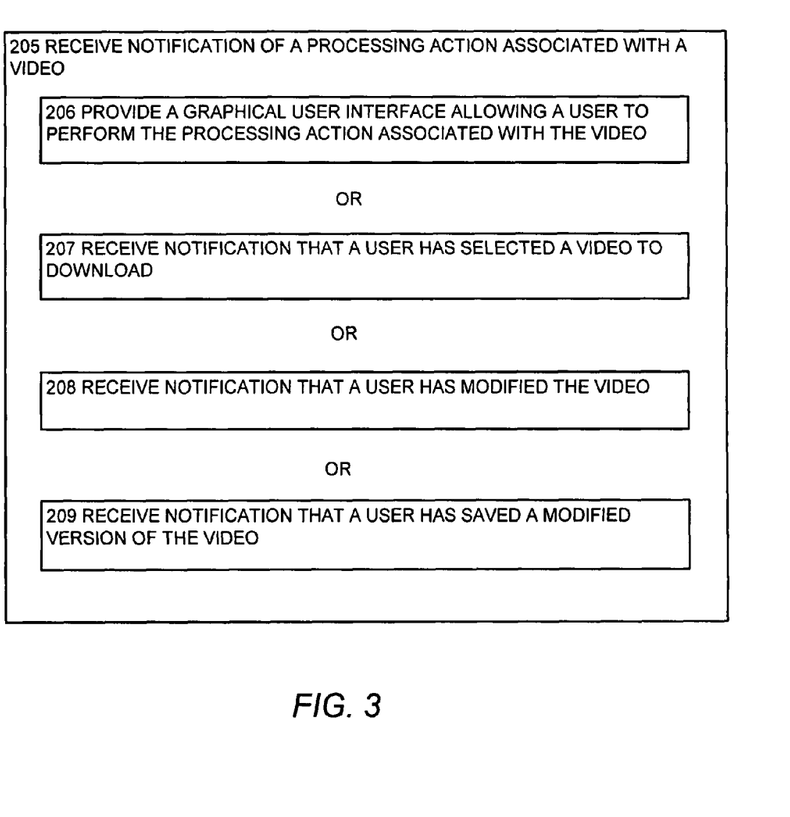
FIG. 3 illustrates a flowchart of a procedure performed by the system of FIG. 1 when the advertisement displaying process receives notification of a processing action associated with a video, and provides a graphical user interface allowing a user to perform the processing action on the video, according to one embodiment disclosed herein.

FIG. 3 is a flowchart of the steps performed by the advertisement displaying process 140-2 when it receives notification of a processing action associated with a video 150.

In step 205, the advertisement displaying process 140-2 receives notification of a processing action associated with a video 150. In an example embodiment, a user 108 is performing processing actions on a video 150 within a graphical user interface 160. The processing actions can include, for example, downloading a video 150 from a video 150 library, making modifications to the video 150, saving the video 150, publishing the video 150, etc. The user 108 believes they are saving a version of the video 150, but the modifications are made to the edit decision list (such as a configuration file), and it is a new version of the edit decision list (such as a configuration file) that is saved, not the video 150.

In step 206, the advertisement displaying process 140-2 provides a graphical user interface 160 allowing a user 108 to perform the processing action associated with the video 150. In an example embodiment, the advertisement displaying process 140-2 provides a graphical user interface 160 that the user 108 downloads to a computer. In another example embodiment, the graphical user interface 160 is an online application that is available to the user 108 via a web browser. As the user 108 edits the video 150, the user 108 is actually using a video editing application that exists on a web site, not a video editing application that has been installed on the user's 108 computer.

In step 207, the advertisement displaying process 140-2 receives notification that a user 108 has selected a video 150 to download. In an example embodiment, the advertisement displaying process 140-2 provides a graphical user interface 160, including a video editor, that allows a user 108 to download videos 150 from a video library, the user's 108 own computer, etc.

In step 208, the advertisement displaying process 140-2 receives notification that a user 108 has modified the video 150. For example, a user 108, such as a video producer, downloads a video 150 from a video library, and edits the video 150 for public distribution.

In step 209, the advertisement displaying process 140-2 receives notification that a user 108 has saved a modified version of the video 150. Once a user 108 modifies a video 150, the user 108 saves that version of the video 150. However, the advertisement displaying process 140-2 actually creates a specification containing the modifications that the user 108 has made to the video 150, but the advertisement displaying process 140-2 does not actually modify the video 150.

Figure 4:
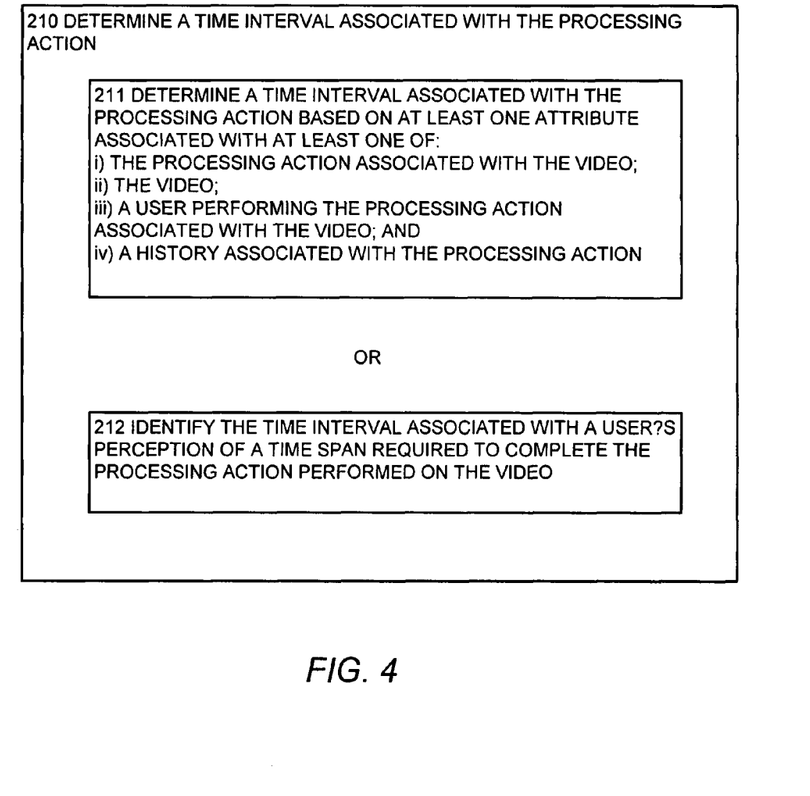
FIG. 4 illustrates a flowchart of a procedure performed by the system of FIG. 1 when the advertisement displaying process determines a time interval associated with the processing action, according to one embodiment disclosed herein.

FIG. 4 is a flowchart of the steps performed by the advertisement displaying process 140-2 when it determines a time interval associated with the processing action.

In step 210, the advertisement displaying process 140-2 determines a time interval associated with the processing action. The time interval is the amount of time it would take for the processing action to actually occur if the processing action had been performed on the video 150.

In step 211, the advertisement displaying process 140-2 determine a time interval associated with the processing action based on at least one attribute associated with at least one of:

i) the processing action associated with the video 150;
ii) the video 150;
iii) a user 108 performing the processing action associated with the video 150; and
iv) a history associated with the processing action.

The processing action associated with the video 150 includes, for example, downloading, modifying, publishing, etc. In an example embodiment, attributes associated with the video 150, such as the length of the video. 150, are taken into consideration when the time interval is determined. For example, publishing (i.e., uploading to the Internet) a five minute video 150 would take longer than publishing a two minute video 150. The advertisement displaying process 140-2 also determines the time interval based on the user 108 performing the processing action on the video 150. 30 The advertisement displaying process 140-2 may determine that particular users 108 are willing to wait a longer time interval for, for example, a video 150 to publish, than other, less patient users 108. The advertisement displaying process 140-2 determines the time interval based on at least one attribute the advertisement displaying process 140-2 has associated with the user 108. The advertisement displaying process 140-2 also determines the time interval based on a history associated with the processing action. For example, if the user 108 has made many modifications to a video 150, and performs the processing action of saving the video 150, the advertisement displaying process 140-2 will increase the time interval, as the user 108 continues to make additional modifications to the video 150.

Alternatively, in step 212, the advertisement displaying process 140-2 identifies the time interval associated with a user's 108 perception of a time span required to complete the processing action performed on the video 150. The advertisement displaying process 140-2 determines the user's 108 perception of how long the processing action should take, based on, for example, the video 150, the processing action, the user 108 performing the processing action, and the history associated with the processing action. In other words, the processing action is not actually performed on the video 150. Rather, an edit decision list is created with the processing action detailed within the specification. When the user 108 performs the processing action on the video 150, it is the edit decision list (such as a configuration file) that is updated with the processing action. However the user's 108 perceived time interval of how long that processing action should take is used to determine how long of an advertisement the advertisement displaying process 140-2 can display to a user 108 during the processing action.

Figure 5:
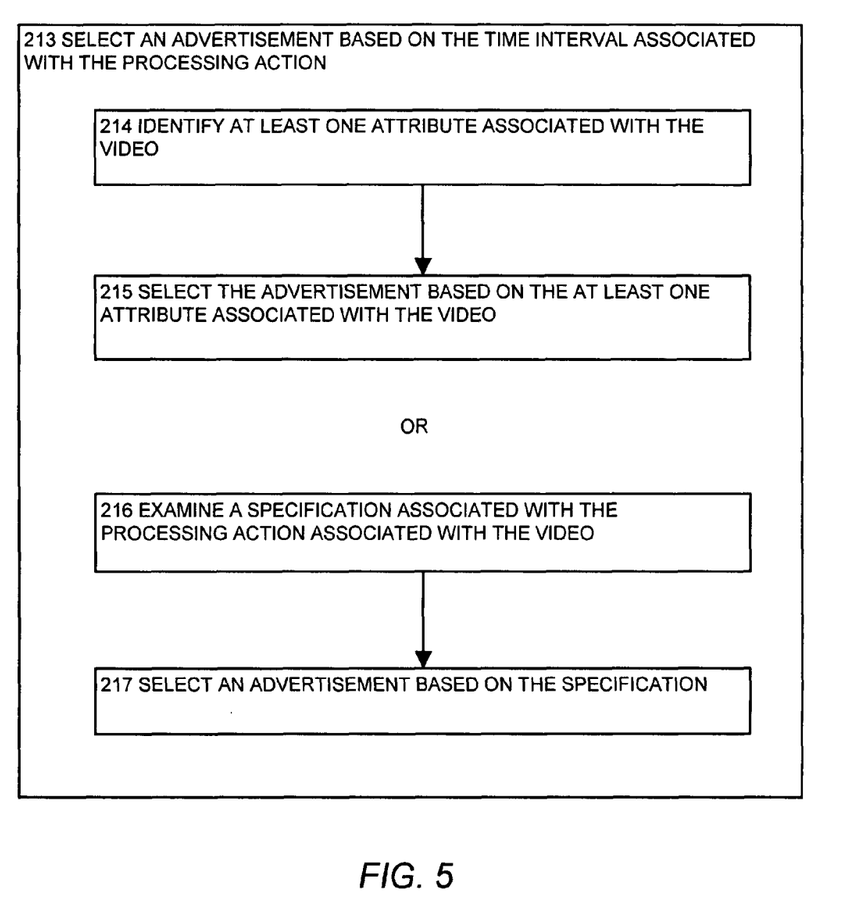
FIG. 5 illustrates a flowchart of a procedure performed by the system of FIG. 1 when the advertisement displaying process selects an advertisement based on the time interval associated with the processing action, according to one embodiment disclosed herein.

FIG. 5 is a flowchart of the steps performed by the advertisement displaying process 140-2 when it selects an advertisement 155 based on the time interval associated with the processing action.

In step 213, the advertisement displaying process 140-2 selects an advertisement 155 based on the time interval associated with the processing action. The advertisement displaying process 140-2 determines how long (i.e., the time interval) a user 108 expects to wait for the processing action to be performed on the video 150. The advertisement displaying process 140-2 then selects a video 150 to display to the user 108 during this time interval.

In step 214, the advertisement displaying process 140-2 identifies at least one attribute associated with the video 150. For example, the advertisement displaying process 140-2 examines the video 150 to determine the content (i.e., the subject matter) of the video 150. The advertisement displaying process 140-2 may also determine, for example, the title of the video 150, the length of the video 150, metatags associated with the video 150, etc.

In step 215, the advertisement displaying process 140-2 selects the advertisement 155 based on at least one attribute associated with the video 150. For example, the advertisement displaying process 140-2 determines that the subject matter of the video 150 relates to Arizona tourism. The advertisement displaying process 140-2 selects advertisement 155 that are related to Arizona tourism. In another example, the advertisement displaying process 140-2 identifies the length of the video 150, and establishes a maximum length of an advertisement 155 to display during the time interval. The advertisement displaying process 140-2 selects an advertisement 155 that has a length that equals or is less than the established maximum length.

Alternatively, in step 216, the advertisement displaying process 140-2 examines a specification associated with the processing action associated with the video 150. As processing actions are performed on the video 150 (i.e., creating, modifying, etc.), a specification, for example, an edit decision list, is created, detailing those processing actions. However, the processing action is not actually performed on the video. When the video 150 is rendered (i.e., published, played, displayed, etc.), the edit decision list (such as a configuration file) is invoked, and the video 150 is rendered according to the processing actions specified in the edit decision list (such as a configuration file). The actual video is never modified, nor are additional versions/copies of the video created. The advertisement displaying process 140-2 examines the edit decision list (such as a configuration file) to determine the appropriate advertisement 155 to select.

In step 217, the advertisement displaying process 140-2 selects an advertisement 155 based on the specification. The advertisement displaying process 140-2 examines the specification, and selects the advertisement 155 based on the information contained within the specification. For example, the edit decision list (such as a configuration file) reveals that many modifications have been made to the video 150. Based on this information, the advertisement displaying process 140-2 determines the time interval to use when selecting the advertisement 155, and then selects an advertisement 155 based on the length of the time interval. In other words, the more modifications that were made to the video 150, the lengthier an advertisement 155 can be selected to display to the user 108 while the user 108 is waiting for the processing action (such as uploading the video 150 to the Internet) to complete.

Figure 6:
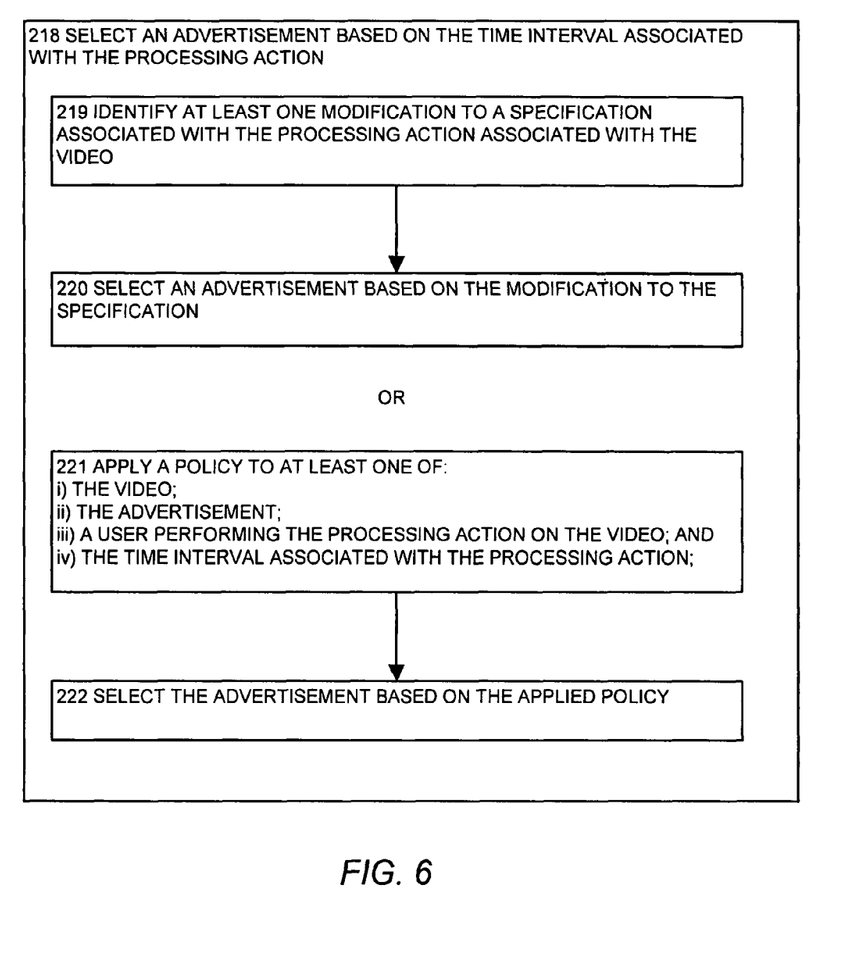
FIG. 6 illustrates a flowchart of a procedure performed by the system of FIG. 1 when the advertisement displaying process selects an advertisement based on the time interval associated with the processing action, and identifies at least one modification to a specification, according to one embodiment disclosed herein.

FIG. 6 is a flowchart of the steps performed by the advertisement displaying process 140-2 when it selects an advertisement 155 based on the time interval associated with the processing action.

In step 218, the advertisement displaying process 140-2 selects an advertisement 155 based on the time interval associated with the processing action. The advertisement displaying process 140-2 determines the time interval based on the user's 108 perception of how long the processing action performed on the video 150 should take. For example, a user 108 publishes (i.e., uploads to the Internet) a lengthy video 150. The user 108 expects to wait a long time for the video 150 to publish. The advertisement displaying process 140-2 determines the amount of time the video 150 would take to publish if the video 150 were actually publishing. Instead, an edit decision list, associated with the video 150, detailing modifications to the video 150, is published. The publishing of the text based edit decision list (such as a configuration file) takes significantly less time than publishing the video 150 would. The advertisement displaying process 140-2 determines a time interval associated with how long it would take to publish the video 150. The advertisement displaying process 140-2 selects an advertisement 155 that can be displayed to the user 108 during the time interval.

In step 219, the advertisement displaying process 140-2 identifies at least one modification to a specification associated with the processing action associated with the video 150. In an example embodiment, the advertisement displaying process 140-2 examines the specification, and determines that a modification has been made to the specification. For example, the advertisement displaying process 140-2 determines that the user 108 has reduced the length of the video 150 by half.

In step 220, the advertisement displaying process 140-2 selects an advertisement 155 based on the modification to the specification. In an example embodiment, the advertisement displaying process 140-2 has downloaded a cache of advertisements 155 that are suitable for displaying during the processing action of the video 150. The advertisement displaying process 140-2 examines the specification, and determines a modification to the specification has been made. The advertisement displaying process 140-2 determines that the user 108 has reduced the length of the video 150 by half, and re-calculates the time interval. The advertisement displaying process 140-2 download a cache of new advertisements 155 that can be displayed during the re-calculated time interval.

Alternatively, in step 221, the advertisement displaying process 140-2 applies a policy to at least one of:
  i) the video;
  ii) the advertisement;
  iii) a user performing the processing action on the video; and
  iv) the time interval associated with the processing action.

In an example embodiment, a policy can be applied by the advertisement displaying process 140-2. The advertisement displaying process 140-2 can apply a policy to, for example, the video 150, based on the content of the video 150. A site host, maintaining a video library from which the user 108 downloads the videos 150, may supply the policy. A policy may be applied to an advertisement 155. For example, the sponsor of the advertisement 155 may apply a policy to the selection of the advertisement 155. A sponsor of an advertisement 155 may not want the advertisement 155 to be displayed when a video 150 associated with the sponsor's competitor is being published (i.e., uploaded to the Internet). A policy may be applied to a user 108. The advertisement displaying process 140-2 may determine that the user 108 is a minor and may apply a policy that advertisements 155 of certain content are not to be displayed for that particular user 108. The policy may also be applied to the time interval. Based on the time interval, the advertisement displaying process 140-2 may determine maximum and minimum thresholds that the advertisement 155 must meet before the ad is selected by the advertisement displaying process 140-2.

In step 222, the advertisement displaying process 140-2 selects the advertisement 155 based on the applied policy. The advertisement displaying process 140-2 may apply a policy to, for example, the video 150, advertisement 155, user 108, time interval, etc., and the selects the advertisement 155 based on the applied policy.

Figure 7:
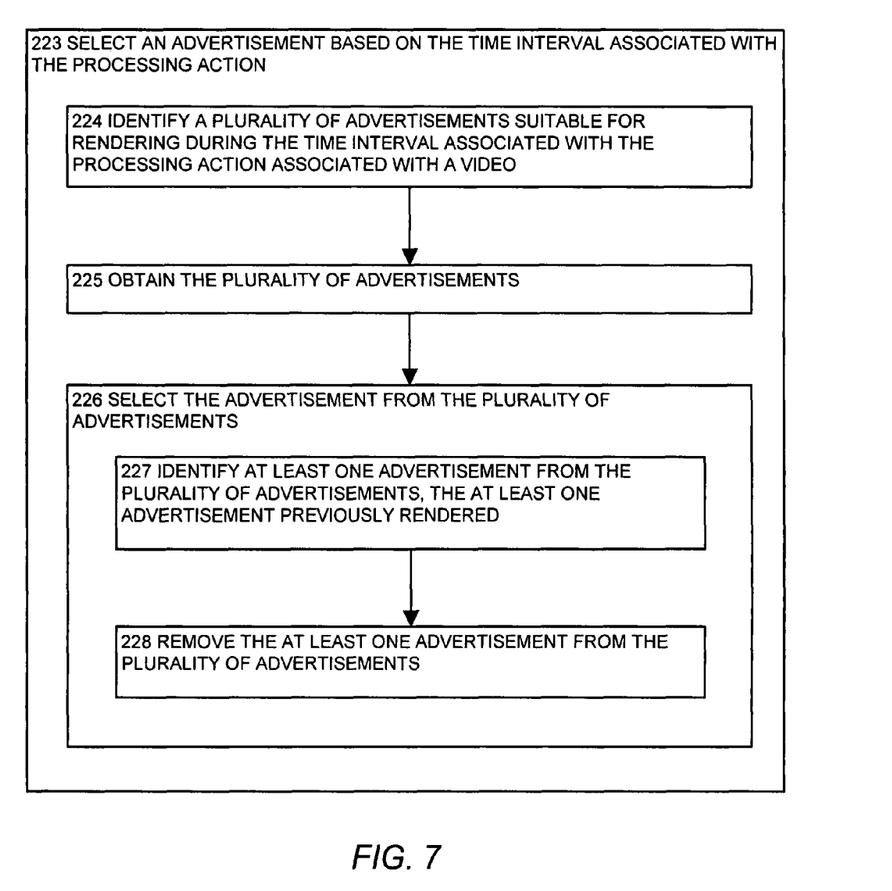
FIG. 7 illustrates a flowchart of a procedure performed by the system of FIG. 1 when the advertisement displaying process selects an advertisement based on the time interval associated with the processing action, and selects a plurality of advertisements, according to one embodiment disclosed herein.

FIG. 7 is a flowchart of the steps performed by the advertisement displaying process 140-2 when it selects an advertisement 155 based on the time interval associated with the processing action.

In step 223, the advertisement displaying process 140-2 selects an advertisement 155 based on the time interval associated with the processing action. The advertisement displaying process 140-2 determines the user's 108 perception of how long the processing action should take, based on, for example, the video 150, the processing action, the user 108 performing the processing action, and the history associated with the processing action. In other words, the processing action is not actually performed on the video 150. Rather, an edit decision list is created with the processing action detailed within the specification. When the user 108 performs the processing action on the video 150, it is the edit decision list (such as a configuration file) is that is actually updated with the processing action. However the time interval is determined by the user's 108 perception of how long that processing action should take. The user's 108 perception of time is used to determine how long of an advertisement the advertisement displaying process 140-2 can display to a user 108 during the processing action.

In step 224, the advertisement displaying process 140-2 identifies a plurality of advertisements 155 suitable for rendering during the time interval associated with the processing action associated with a video 150. In an example embodiment, the advertisement displaying process 140-2 identifies a plurality of advertisements 155 suitable for displaying to the user 108, and rotates the presentation of those advertisements 155 to the user 108.

In step 225, the advertisement displaying process 140-2 obtains the plurality of advertisements 155. In an example embodiment, the advertisement displaying process 140-2 caches the plurality of advertisements 155. In another example embodiment, the advertisement displaying process 140-2 streams in the advertisement 155 at the time the advertisement 155 is being rendered in the graphical user interface 160.

In step 226, the advertisement displaying process 140-2 selects the advertisement 155 from the plurality of advertisements 155. In an example embodiment, the advertisement displaying process 140-2 determines that more than one advertisement 155 from the plurality of advertisement 155 are suitable to be rendered in the graphical user interface 160. The advertisement displaying process 140-2 may modify the specification with information associated with those advertisements 155 that are determined to be suitable to be rendered during the processing action on the video 150.

In step 227, the advertisement displaying process 140-2 identifies at least one advertisement 155 from the plurality of advertisement 155 that has been previously rendered on the graphical user interface 160. The advertisement displaying process 140-2 determines that at least on advertisement 155 has already been rendered to the user 108. In other words, the advertisement displaying process 140-2 identifies those advertisements 155 that the user 108 has already seen.

In step 228, the advertisement displaying process 140-2 removes at least one advertisement 155 from the plurality of advertisement 155. In an example embodiment, the advertisement displaying process 140-2 identifies those advertisements 155 the user 108 has already seen, and removes those advertisement 155 from the plurality of available advertisements 155. Thus, each time an advertisement 155 is displayed to the user 108, the advertisement 155 is new to the user 108.

Figure 8:
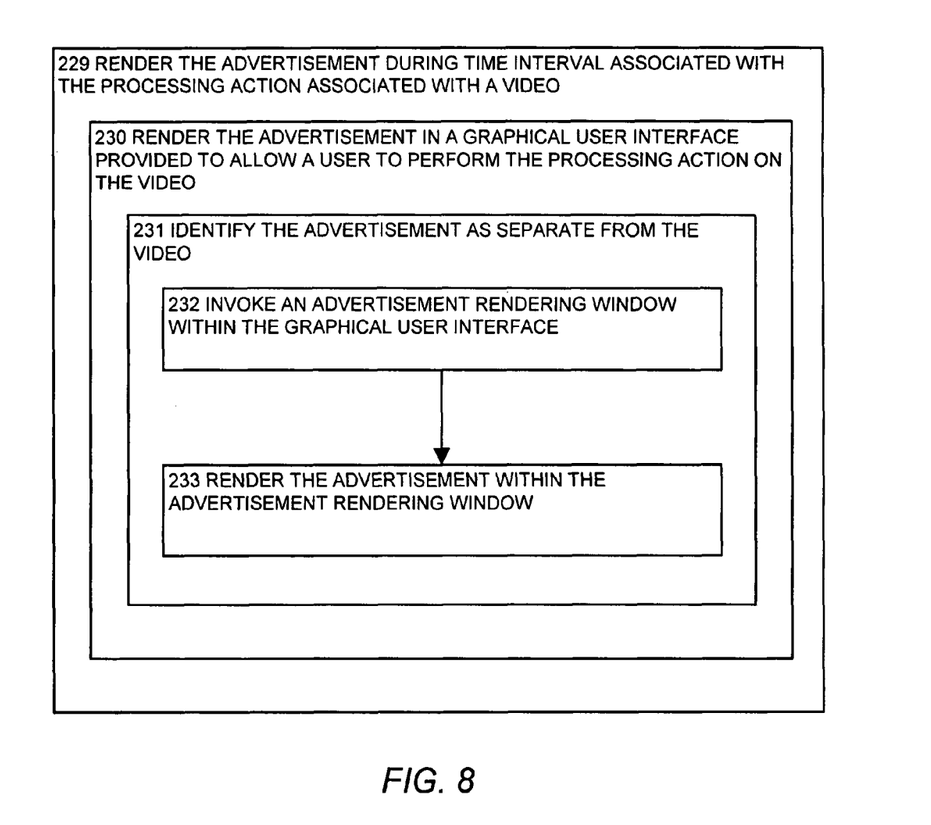
FIG. 8 illustrates a flowchart of a procedure performed by the system of FIG. 1 when the advertisement displaying process renders the advertisement during time interval associated with the processing action associated with a video, according to one embodiment disclosed herein.

FIG. 8 is a flowchart of the steps performed by the advertisement displaying process 140-2 when it renders the advertisement 155 during time interval associated with the processing action associated with a video 150.

In step 229, the advertisement displaying process 140-2 renders the advertisement 155 during time interval associated with the processing action associated with a video 150. In an example embodiment, the user 108 downloads a video editing application to the user's 108 computer, and views the advertisement 155 within the video editing application. In another example embodiment, the user 108 uses an online video editing application to perform processing on the video 150, and views the advertisement 155 within the browser of the online video editing application.

In step 230, the advertisement displaying process 140-2 renders the advertisement 155 in a graphical user interface 160 provided to allow a user 108 to perform the processing action on the video 150. In an example embodiment, the video 150 is displayed within the same graphical user interface 160 that the user 108 uses to perform processing actions (i.e., downloading, creating, editing, saving, publishing, etc.).

In step 231, the advertisement displaying process 140-2 identifies the advertisement 155 as separate from the video 150. In an example embodiment, the advertisement displaying process 140-2 renders the advertisement 155 such that the user 108 is not confused that the advertisement 155 is associated with the video 150. In other words, the advertisement 155 is displayed separately such that the user 108 understands that when the user 108 publishes the video 150, other viewers of the video 150 may not view the advertisement 155 that the user 108 is viewing.

In step 232, the advertisement displaying process 140-2 invokes an advertisement 155 rendering window within the graphical user interface 160. In an example embodiment, a pop up window appears within the graphical user interface 160. The pop up window is an advertisement 155 rendering window for the display of the advertisement 155.

In step 233, the advertisement displaying process 140-2 renders the advertisement 155 within the advertisement rendering window. The advertisement displaying process 140-2 displays the advertisement 155 within the advertisement rendering window such that the user 108 understands that the displaying of the advertisement 155 is separate from the rendering of the video 150.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method comprising:
   receiving input defining a processing action associated with a video;
   determining a time interval associated with the processing action;
   analyzing content of the video;
   selecting a cache of advertisements based at least in part on the content of the video and a policy applied to the cache of advertisements;
   selecting an advertisement from the cache of advertisements based on the time interval associated with the processing action; and
   rendering the advertisement during the time interval associated with the processing action associated with the video instead of carrying out the processing action during the time interval.

2. The method of claim 1 further comprising:
   creating a specification associated with the processing action associated with the video, the specification identifying at least one of:
   i) the video;
   ii) the processing action associated with the video;
   iii) the time interval associated with the processing action; and
   iv) the advertisement.

3. The method of claim 1, further comprising:
   providing a graphical user interface configured to receive the input defining the processing action associated with the video.

4. The method of claim 1 wherein determining the time interval associated with the processing action comprises:
   determining a time interval associated with the processing action based on at least one attribute associated with at least one of:
   i) the processing action associated with the video;
   ii) the video;
   iii) a user performing the processing action associated with the video; and
   iv) a history associated with the processing action.

5. The method of claim 1 wherein determining the time interval associated with the processing action comprises:
   identifying the time interval associated with a user's perception of a time span required to complete the processing action had the processing action been performed on the video.

6. The method of claim 1 wherein selecting the advertisement from the cache of advertisements based on the time interval associated with the processing action comprises:
   identifying at least one attribute associated with the subject matter of the video; and
   selecting the advertisement based on the at least one attribute associated with the subject matter of the video.

7. The method of claim 1 wherein selecting the advertisement from the cache of advertisements based on the time interval associated with the processing action comprises:
   examining a specification associated with the processing action associated with the video; and
   selecting the advertisement based on the specification.

8. The method of claim 1 wherein selecting the advertisement from the cache of advertisements based on the time interval associated with the processing action comprises:
   identifying at least one modification to a specification associated with the processing action associated with the video; and
   selecting the advertisement based on the modification to the specification.

9. The method of claim 1 wherein selecting the advertisement from the cache of advertisements based on the time interval associated with the processing action comprises:
   applying the policy to at least one of:
   i) the video;
   ii) the advertisement;
   iii) a user performing the processing action on the video; and
   iv) the time interval associated with the processing action; and
   selecting the advertisement based on the applied policy.

10. The method of claim 1 wherein selecting the advertisement from the cache of advertisements based on the time interval associated with the processing action comprises:
    identifying a plurality of advertisements suitable for rendering during the time interval associated with the processing action associated with the video;
    obtaining the plurality of advertisements; and
    selecting the cache of advertisements from the plurality of advertisements based at least in part on the content of the video and the policy.

11. The method of claim 10 wherein selecting the cache of advertisements from the plurality of advertisements comprises:
    identifying at least one advertisement from the plurality of advertisements, the at least one advertisement previously rendered; and
    removing the at least one advertisement from the plurality of advertisements.

12. The method of claim 1 wherein rendering the advertisement during the time interval associated with the processing action associated with the video comprises:
    rendering the advertisement in a graphical user interface provided to allow a user to perform the processing action on the video.

13. The method of claim 12 wherein rendering the advertisement in a graphical user interface provided to allow a user to perform the processing action on the video comprises:
    identifying the advertisement as separate from the video.

14. The method of claim 13 wherein identifying the advertisement as separate from the video comprises:

invoking an advertisement rendering pop-up window within the graphical user interface; and rendering the advertisement within the advertisement rendering pop-up window.

15. The method of claim 1 further comprising generating an edit decision list detailing the processing action associated with the video, the edit decision list to be invoked when the video is rendered.

16. The method of claim 15 wherein the time interval associated with the processing action is greater than a time interval associated with generating the edit decision list.

17. The method of claim 1, wherein:
the processing action requires creating a new copy of the video or modifying the video;
the time interval associated with the processing action comprises time required to create the new copy of the video or modify the video; and
the video is not modified or copied during the time interval.

18. The method of claim 1, wherein:
the processing action requires creating a new copy of the video or modifying the video;
the time interval associated with the processing action comprises time required to create the new copy of the video or modify the video;
the video is not modified or copied during the time interval; and
an edit decision list is generated or modified based on the input specifying the processing action, wherein the edit decision list specifies the processing action such that when the video is rendered, the edit decision list is invoked and the video is rendered according to the processing action specified in the edit decision list.

19. A non-transitory computer readable medium encoded with computer programming logic that when executed on a process in a computerized device displays an advertisement, the medium comprising:
instructions for receiving input defining a processing action associated with a video;
instructions for generating an edit decision list in response to the input;
instructions for determining a time interval associated with the processing action;
instructions for analyzing content of the video;
instructions for selecting a cache of advertisements based at least in part on the content of the video and a policy applied to the cache of advertisements;
instructions for selecting an advertisement from the cache of advertisements based on the time interval associated with the processing action; and
instructions for rendering the advertisement during the time interval associated with the processing action associated with the video instead of carrying out the processing action during the time interval.

20. The computer readable medium of claim 19,
wherein said instructions further comprise:
instructions for creating a specification associated with the processing action associated with the video, the specification identifying at least one of:
i) the video;
ii) the processing action associated with the video;
iii) the time interval associated with the processing action; and
iv) the advertisement.

21. A device comprising:
a memory;
a processor;
a communications interface;
an interconnection mechanism coupling the memory, the processor and the communications interface;
wherein the memory is encoded with an advertisement displaying application that when executed on the processor is capable of displaying advertisements on the computerized device by performing the operations of:
receiving input defining a processing action associated with a video and generating an edit decision list to be invoked when the video is rendered, the edit decision list used instead of carrying out the processing action;
determining a time interval associated with the processing action;
analyzing content of the video;
selecting a cache of advertisements based at least in part on the content of the video and a policy applied to the cache of advertisements;
selecting an advertisement from the cache of advertisements based on the time interval associated with the processing action; and
rendering the advertisement during the time interval associated with the processing action associated with the video instead of carrying out the processing action during the time interval.

22. The system of claim 21, wherein the input defining the processing action identifies a desired change to the video, and wherein after the advertisement is rendered, data of the video does not indicate the desired change.

* * * * *